(12) United States Patent
Schuster et al.

(10) Patent No.: US 6,650,619 B1
(45) Date of Patent: Nov. 18, 2003

(54) METHOD AND SYSTEM FOR FACILITATING INCREASED CALL TRAFFIC BY REDUCING SIGNALING LOAD IN AN EMERGENCY MODE

(75) Inventors: Guido M. Schuster, Des Plaines, IL (US); Ikhlaq S. Sidhu, Vernon Hills, IL (US); Thomas J. Kostas, Evanston, IL (US); David A. Grabelsky, Skokie, IL (US)

(73) Assignee: UTStarcom Incorporated, Alameda, CA (US)

( * ) Notice: Subject to any disclaimer, the term of this patent is extended or adjusted under 35 U.S.C. 154(b) by 0 days.

(21) Appl. No.: 09/270,969

(22) Filed: Mar. 17, 1999

(51) Int. Cl.$^7$ ............................................... H04L 12/26
(52) U.S. Cl. ..................................................... 370/230
(58) Field of Search ................................ 370/229, 230, 370/231, 235, 236, 237, 238, 352, 353, 354, 355, 356, 395.2, 395.21, 401, 230.1

(56) References Cited

U.S. PATENT DOCUMENTS

| | | | | |
|---|---|---|---|---|
| 5,933,490 A | * | 8/1999 | White et al. | 379/221.01 |
| 6,295,292 B1 | * | 9/2001 | Voit et al. | 370/352 |
| 6,307,839 B1 | * | 10/2001 | Gerszberg et al. | 370/230 |
| 6,333,931 B1 | * | 12/2001 | LaPier et al. | 370/352 |
| 6,389,005 B1 | * | 5/2002 | Cruickshank | 370/352 |

OTHER PUBLICATIONS

Paul Ferguson, "Simple Differential Services: IP TOS and Precedence, Delay Indication, and Drop Preference," Internet Draft, Mar. 12, 1998.

Ed Ellesson and Steven Blake, "A Proposal for the Format and Semantics of the TOS Lyte and Traffic Class Byte in IPv4 and IPv6 Headers," Internet Engineering Task Force, Internet Draft, Nov. 1997.

Kathleen Nichols and Steven Blake, "Differentiated Services Operational Model and Definitions," Internet Engineering Task Force, Internet Draft, Feb. 1998.

Diff-serv-interest archive message 00003, Re: header rqts to support tracesl??, http://www.nrg.ee.lbl.,gov/diff-serv-interest/msg00003.html, dated Aug. 5, 1998.

SNA Services, "SLAs for SNA: What's Wrong with This Picture?," *Data Communications*, pp. 85–90, Aug. 1998.

Access, "Bandwidth Tools Branch Out," *Inter@ctive Week*, Oct. 26, 1998.

(List continued on next page.)

*Primary Examiner*—Kwang Bin Yao
(74) *Attorney, Agent, or Firm*—McDonnell Boehnen Hulbert Berghoff (57) ABSTRACT

A system for increasing call capacity of an internet telephony system in an emergency mode, such as where there is a surge of call requests in a particular region. A management system in the internet telephony system may detect the presence of an actual or potential state of congestion of call traffic and/or signaling traffic. In order to admit a higher rate of call traffic to the telephony system, action is taken to reduce the workload of the signaling system, in order to allow the telephony system to focus more on serving call requests. For example, the signaling system may reduce the rate of signaling request messages processed with respect to requested and ongoing calls and/or reduce the amount of processing involved in handling such messages.

76 Claims, 4 Drawing Sheets

OTHER PUBLICATIONS

Quality of Service: Delivering QoX on the Internet and in Corporate Networks, http://www.wiley.com/compbooks/catalog/24358-2.htm, printed from the World Wide Web on Sep. 9, 1998.

An Economic Paradigm for QoS Provisioning in Information Systems, http://www.ics.forth.gr/~ramesh/pricing.html, printed from the World Wide Web on Sep. 9, 1998.

Microsoft Windows NT Server, Netshow Services Streaming Media for Business, Quality of Service, printed from the World Wide Web on Sep. 8, 1998.

Paul Ferguson and Geoff Huston, "Quality of Service in the Internet: Fact, Fiction, or Compromise?," printed from the World Wide Web on Sep. 9, 1998.

Access, "Policy–Based Gear to Debut," *Inter@ctive Week*, Sep. 7, 1998.

Remote Access & The Internet, "A Better Internet Awaits Us," *Lantimes*, Aug. 3, 1998.

Networking & Telecom, "QOS faces Growing Pains," *Infoworld*, May 25, 1998.

Netweek, "Newest QOS Plans Follows Same Old Pattern," *PC Week*, Jul. 13, 1998.

Creating a More Predictable Network, "Toward a Predictable WAN," *Lantimes*, Aug. 3, 1998.

Creating a More Predictable Network, "A Broad Future for Backbones," Lantimes, Aug. 3, 1998.

Technology Update, Packet Labeling Standard to Boost IP Performance, *Network World*, Jul. 13, 1998.

Strategies, "Deciphering SLAs," *PC Week*, Jul. 13, 1998.

* cited by examiner

METHOD AND SYSTEM FOR FACILITATING INCREASED CALL TRAFFIC BY REDUCING SIGNALING LOAD IN AN EMERGENCY MODE

BACKGROUND OF THE INVENTION

1. Field of the Invention

The present invention relates to telecommunications transmission systems and more particularly to methods for facilitating increased call capacity in a telephony system when faced with an actual or likely surge in demand for use of the system.

2. Description of the Related Art

The invention is particularly useful in the context of internet telephony (also known as voice-over-IP (VoIP) or IP telephony), which should be understood to be a telephone system in which real-time media signals and/or data signals are communicated via a packet switched network such as the Internet, whether between two parties or between multiple parties (in a conference or multicast environment). Internet telephony may also be referred to as packet switched telephony. More generally, however, the invention may extend to use in connection with the communication of any real-time media and/or data signals over any packet switched communications link, including, for instance, IP, ATM, frame relay, X.25 and SNA networks, whether local area, metropolitan area or wide area, and point-to-point or direct end-to-end connections.

Those skilled in the art are familiar with the basic configuration of an internet telephony system. Architectural elements and functions suitable for use in one such system are described, for instance, by the H.323 standard for multimedia transmissions, as published by the International Telecommunications Union (ITU). The entirety of the H.323 standard is hereby incorporated herein by reference. The present invention, however, is not necessarily limited to use in the H.323 configuration but may extend to other configurations or other transmission protocols now known or later developed. For example, and without limitation, another protocol that can support internet telephony is Session Initiation Protocol, or SIP.

In general, an internet telephony system facilitates telephone communication between two or more users over a packet switched, such as an IP network for example. Each user is positioned at a telephone device (hereafter "telephone"), which is generally any communications device capable of communicating real-time media signals such as speech, audio and/or video, for example. By way of example and without limitation, the telephone device may be a conventional analog telephone (e.g., a "black box telephone"), a digital telephone, a videophone, and/or a multi-media personal computer. Each telephone device (and/or telephone number) is then typically served by a network access server, which provides connectivity to the packet switched network. In the context of internet telephony, the network access server may be referred to as an internet telephony gateway ("ITG" or "gateway") and is typically owned and operated by an internet telephony service provider (ITSP).

Alternatively, the telephone device itself may provide connectivity with the packet switched network and may serve other gateway-functions as well. Such a telephone device may be referred to as an "internet telephone" and may take any of a variety of forms now known or later developed.

To place a call over a packet switched network via an initiating gateway, a user at an initiating telephone device may establish a connection with the initiating gateway via a suitable communications link such as the public switched telephone network (PSTN) and/or other circuit switched or packet switched network or direct link. The communications link may be a permanent or semi-permanent connection (as in the case of a LAN connection between the telephone device and the gateway), which may facilitate direct dialing. Alternatively, to connect with the gateway, the user may need to place a call to the gateway via the public switched telephone network, such as by dialing a telephone number designated by the user's ITSP. In any event, the user may specify the telephone number of the called party.

The gateway serves as an interface between the packet switched network and the communications link, and in turn the telephone device. In this regard, for instance, the gateway typically performs translation between protocols, data formats and media types, to facilitate communication of information between two possibly different types of networks or links. For example, a gateway may be configured to receive a real-time media stream from the telephone device via the communications link and to encode (e.g., compress and packetize) the stream into a sequence of packets for transmission over the packet switched network to a remote destination. Similarly, a gateway may be configured to decode (e.g., de-packetize and decompress) data arriving from the packet switched network and to forward the resulting media stream via a communications link to a specified telephone device.

In a packet switched network, the location of each gateway and other element is identified by a network address. Therefore, provided with the telephone number of a called party, the initiating gateway must identify the network address of a terminating gateway that can serve the called number. To identify the network address, the gateway may query an address mapping database or may communicate with another device or process in the internet telephony system to obtain the necessary address based on the dialed number.

Given the network address of the terminating gateway, the initiating gateway may then contact the terminating gateway via the packet switched network and notify the terminating gateway of the desire to establish a connection with the called party. The terminating gateway may then establish an appropriate connection (e.g., over a communications link such as the PSTN) with a telephone device at the called number and notify the initiating gateway that the call can proceed. With the end-to-end connection thus established between the calling and called parties, the parties may then communicate with each other over the packet switched network, sending and receiving various communications signals, such as voice, video, audio and/or data.

In any telephony system, a signaling system must be provided in order to facilitate various functions involved in setting up and conducting calls. By way of example and without limitation, these functions might include monitoring the status of telephone lines to determine whether they are busy, idle or requesting service, establishing caller authorization and accounting, and sending routing and destination information throughout the system such as to alert devices in the system that a call is incoming and to establish an appropriate path of communication.

The signaling system typically provides for communication of signaling messages among elements of the telephony system. The signaling messages are used to convey signaling information such as requests, responses and status information. In addition, the signaling system typically includes a device or process to carry out signaling functions associated with various messages. For purposes of this description, this processing unit may be referred to generally as a "signaling server" or "gatekeeper." In most cases, the signaling sever includes a database system or is configured to access one or more back-end database servers that can be used to facilitate various signaling functions.

In the context of internet telephony, for example, a variety of signaling functions are typically performed to facilitate call setup and communication. In terms of call setup, for instance, these signaling functions may include call authorization (e.g., determining whether the caller's account is current and valid, such as ensuring that the caller has paid all past bills or verifying a caller's personal identification number or security code), call accounting (e.g., notifying a billing entity that a call is being placed, in order to enable a service provider to charge for the call), address translation (e.g., identifying a network address of a terminating gateway that can serve the telephone number dialed by the caller) and establishing call connection (e.g., ensuring that a communications path exists between the call participants and that all participants are available). In terms of conducting a call, these signaling functions may include monitoring and adjusting bandwidth and conveying information such as ANI identification (e.g., for call-waiting-caller-ID or three-way calling functionality), for example.

In an exemplary configuration, each gatekeeper may serve a group of one or more gateways. Each gateway may receive call requests representing incoming calls (e.g., from subscribers and/or telephone devices). For each call request that a gateway receives, the gateway may communicate with its respective gatekeeper via one or more signaling messages to determine whether the call is allowed to proceed, to establish appropriate billing for the call, to determine where in the network to send the call, and/or to perform one or more other functions. The gatekeeper must usually consider and respond to each of these requests, and in many cases the gatekeeper must query one or more back-end databases in the process. In turn, the gatekeeper may return one or more response messages to the requesting gateway.

The gatekeeper may also be involved in establishing the call connection and conveying control messages between the gateways that serve participants to the internet telephony call. In this regard, for instance, H.323 defines two different signaling mechanisms for routing call-connection and call-control messages, gatekeeper-routed signaling and direct-routed signaling. In the gatekeeper-routed model, certain call setup and control messages are routed between the participating gateways via one or more gatekeepers that serve the gateways. In the direct-routed model, in contrast, the call setup and control messages are conveyed directly between the gateways that serve the call participants, without the assistance of the gatekeeper(s).

SUMMARY OF THE INVENTION

The present invention provides a system (e.g., method, machine and/or apparatus) to facilitate handling of increased call traffic in a packet switched telephony system. The invention stems at least in part from a realization that the signaling system facilitating call-setup, connection and/or other functions, can itself serve as a bottleneck to call admission in high traffic situations. In particular, in some circumstances, the signaling system may become overloaded, and every call request to be admitted to the network may have to wait longer to be served by the signaling system and in turn admitted. As the number of calls approaches the capacity that the signaling system is designed to handle, the call admission process may become unstable. In a worst case, the waiting time per call request may increase exponentially until the point that system can no longer serve call requests.

In some instances, it may be considered unacceptable or even dangerous to block calls from proceeding. For instance, when there is a natural disaster such as an earthquake, hurricane or flood, the importance of serving call requests and connecting some or all calls may be considered paramount. It would therefore be useful to provide a mechanism to facilitate handling more calls when desired.

To alleviate and/or help avoid this signaling bottleneck, we contemplate reducing the load of the signaling system in response to the existence or likelihood of congestion in the internet telephony system (as, for instance, in response to an emergency such as a natural disaster). In one aspect, this reduction may involve streamlining the set-up and/or connection process per call, in order to more quickly admit calls into the network and thereby admit more calls per unit time. In another aspect, this reduction may involve decreasing the amount of signaling more generally in the telephony system, in order to allow the signaling system to more efficiently focus on and handle the admission of calls and thereby admit more calls per unit time.

According to one aspect of a preferred embodiment, a method is provided by which a signaling server in a packet switched telephony system learns of a state of congestion (e.g., the signaling server receives a control signal indicating the situation, and/or detects the situation). In response, the signaling server may change to an emergency mode or congestion mode in which the signaling server may be set to not perform certain back-end server queries that it would otherwise perform, or to otherwise reduce the processing and/or time involved in conducting such queries (e.g., minimizing the queries in some way). Additionally, in the emergency mode, the signaling server may instruct its registered gateways (e.g., via a control signal over the packet switched network) to reduce the number of signaling messages that they send to the signaling server, such as by switching to direct-routing of call-connection and call-control messages and/or by sending fewer admission requests per call request.

According to yet another aspect of a preferred embodiment, for instance, a method is provided by which a gateway or other terminal in a packet switched telephony system learns of an emergency situation and responsively switches to an emergency mode in which it does not send certain signaling messages to the signaling server. For example, where the switch would normally send authorization and accounting requests to the signaling server, the switch might not send those request messages when the switch is in the emergency mode. As another example, the switch may be set in the emergency mode to not send address-mapping requests to the gatekeeper and to optionally limit incoming calls to only a predefined set of emergency numbers such as police and fire department, for instance (thereby avoiding the need to request address translation services from the signaling system).

In accordance with a further aspect of the present invention, a management system may be provided in order to detect a state of congestion (e.g., call congestion and/or signaling congestion) in the internet telephony system. When the management system detects a state of congestion, the management system may signal the state of congestion to one or more entities (devices and/or processes) in the telephony system. The one or more entities may then responsively take action to reduce the signaling workload in the system, thereby allowing the signaling system to serve a higher rate of call requests and to therefore permit a higher rate of call admission.

These and other advantages and features of the present invention will become apparent to those skilled in the art by reading the following detailed description, with reference where appropriate to the accompanying drawings.

BRIEF DESCRIPTION OF THE DRAWINGS

A preferred embodiment of the present invention is described herein with reference to the drawings, in which.

DETAILED DESCRIPTION OF THE PREFERRED EMBODIMENT

Figure 1:
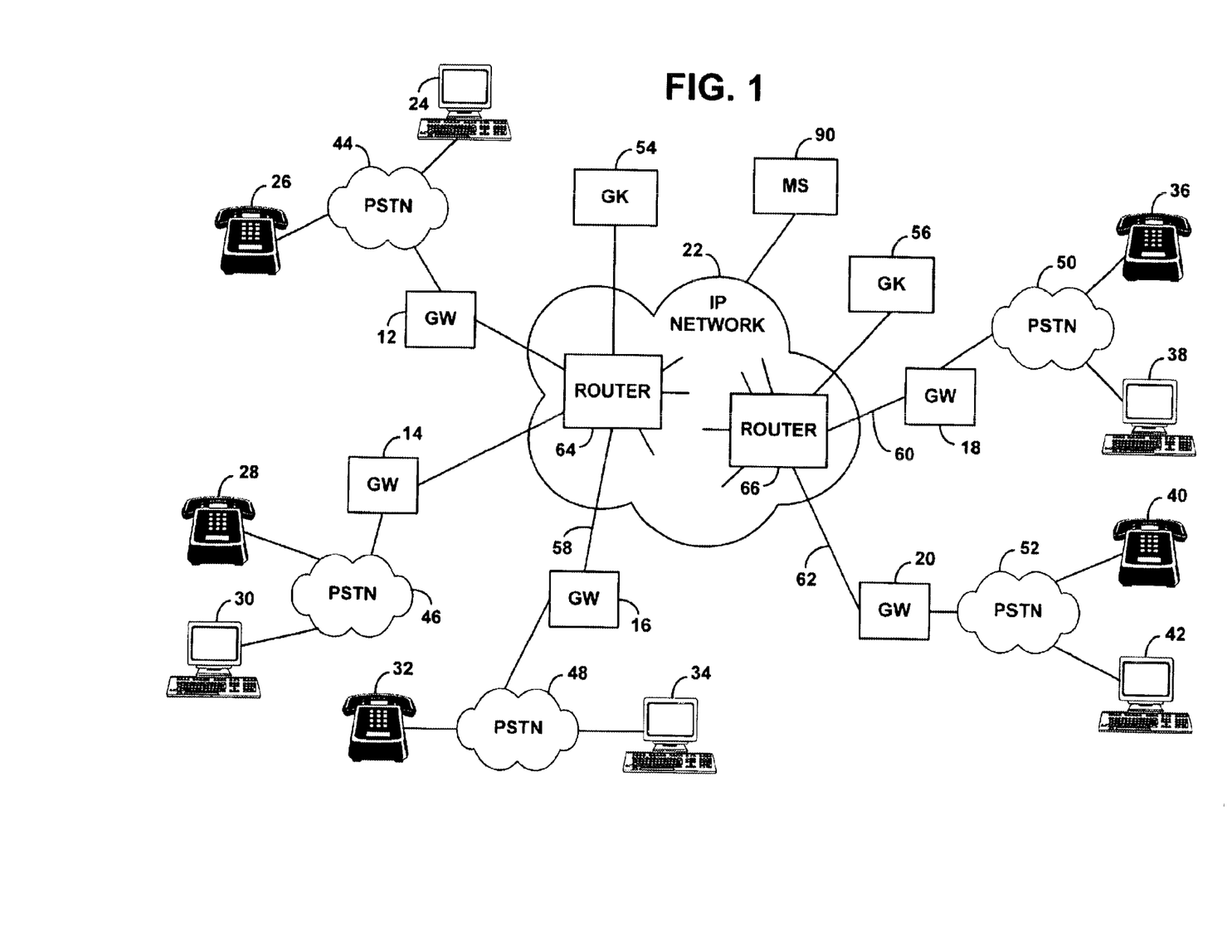
FIG. 1 is a schematic illustration of an internet telephony system in which a preferred embodiment of the present invention may be employed.

Referring to the drawings, FIG. 1 illustrates schematically an exemplary internet telephony system in which a preferred embodiment of the present invention may be employed. As shown in FIG. 1, a plurality of internet telephony gateways (GW) 12–20 each provide connectivity with a packet switched network (shown, for example, as an UP network) 22. Subscribers sign up for service offered by one or more internet telephony service providers (ITSPs). Each subscriber may then use a telephone device 24–42, which is arranged to convey (and preferably receive) media streams such as voice, video, audio, and/or data, for instance. By way of example and without limitation, the telephone device may be a conventional analog telephone (e.g., a "black box telephone"), a digital telephone, a videophone, and/or a multi-media personal computer (e.g., equipped with a microphone and speaker), or a standard analog or digital telephone, whether corded or wireless. The telephone device may take any other form as well.

A subscriber may establish a connection via a communications link between the telephone device and an initiating gateway operated by the subscriber's ITSP. This communications link may take any form. As described above, and as illustrated in FIG. 1, for instance, the link may comprise the PSTN (or more broadly, the general switched telephone network (GSTN)) 44–52. The link may also or instead comprise another suitable computer network (such as a LAN, for instance) (not shown) or direct end-to-end connection (not shown) between the subscriber's telephone device and the gateway. In general, the communications link may provide a plurality of media streams to the gateway at once, in the form of a channelized or time-slotted data stream such as a TDM stream. Each media stream, for instance, may correspond to media provided by one of the telephone devices served by the gateway.

As noted above, the gateway acts as an interface between the communications link and the packet switched network. To effect the transmission of media streams from the communications link into the packet switched network, for instance, the gateway may encode each input media stream according to a predetermined encoding process. Typically, this encoding process conforms with one or many well known encoding schemes, such as G.723.1 and G.711 for audio, and H.261 and H.263 for video (as recommended by the International Telecommunications Union), for example, and results in a sequence of packets corresponding to the input media stream. However, any suitable encoding process may be employed.

Exemplary internet telephony gateways are commercially available from 3Com Corporation and other telecommunications equipment manufacturers such as Ascend Communications, Livingston Enterprises, Multitech and Cisco. A representative gateway, for instance, is the Total Control™ IP Telephony Gateway from 3Com Corporation. The Total Control™ IP Telephony Gateway takes substantially the form of a network access server (NAS) as described in the patent of Dale M. Walsh, et al., U.S. Pat. No. 5,597,595 ("the Walsh patent"), which is fully incorporated herein by reference and to which the reader is directed for additional details. Additional aspects of an exemplary gateway are described, for instance, in the patent of Baum et al., U.S. Pat. No. 5,577,105, and the U.S. patent application of Verthein et al., application Ser. No. 08/813,173, each of which is fully incorporated herein by reference as well.

An exemplary gateway has a telephone line interface that can be connected to a plurality of high-speed multiplexed digital telephone lines, such as T1 or ISDN lines. The gateway further provides a plurality of digital modems to perform signal conversions (such as sampling, compressing and packetizing) on the data from the telephone line channels and a bus network connecting the modems to a network interface card or module. The network interface card in turn couples the gateway to a local or wide area network, such as the ISP backbone network of the Internet. The modems and/or network interface card or other aspect of the gateway may include a processor and a memory (i.e., any data storage medium). The memory may store machine language instructions defining one or more programs executable by the processor to perform various functions described herein.

As presently envisioned, the gateway is itself an optional physical component of the internet telephony system. Many of its functions may instead be implemented by another terminal such as a telephone device configured to interface directly with the packet switched network. In this respect, the telephone device may take the form of an internet telephone for instance, which might internally convert input media (such as voice) to packets and directly transmit the packets into the packet switched network. Therefore, where the present description refers to a gateway or a gateway/terminal, it should be understood that the gateway or gateway/terminal may be replaced by another terminal such as a stand-alone internet telephone type device.

A number of gateways in a given geographic region may transmit their output packets via network links to a downstream, regional packet router. As shown by way of example in FIG. 1, for instance, gateways 12, 14 and 16 may transmit packets to router 64, and gateways 18 and 20 may transmit packets to router 66. The packet router in turn serves to route each packet independently to a next node in the packet switched network, on the way to a destination address specified in the packet header.

Figure 2:
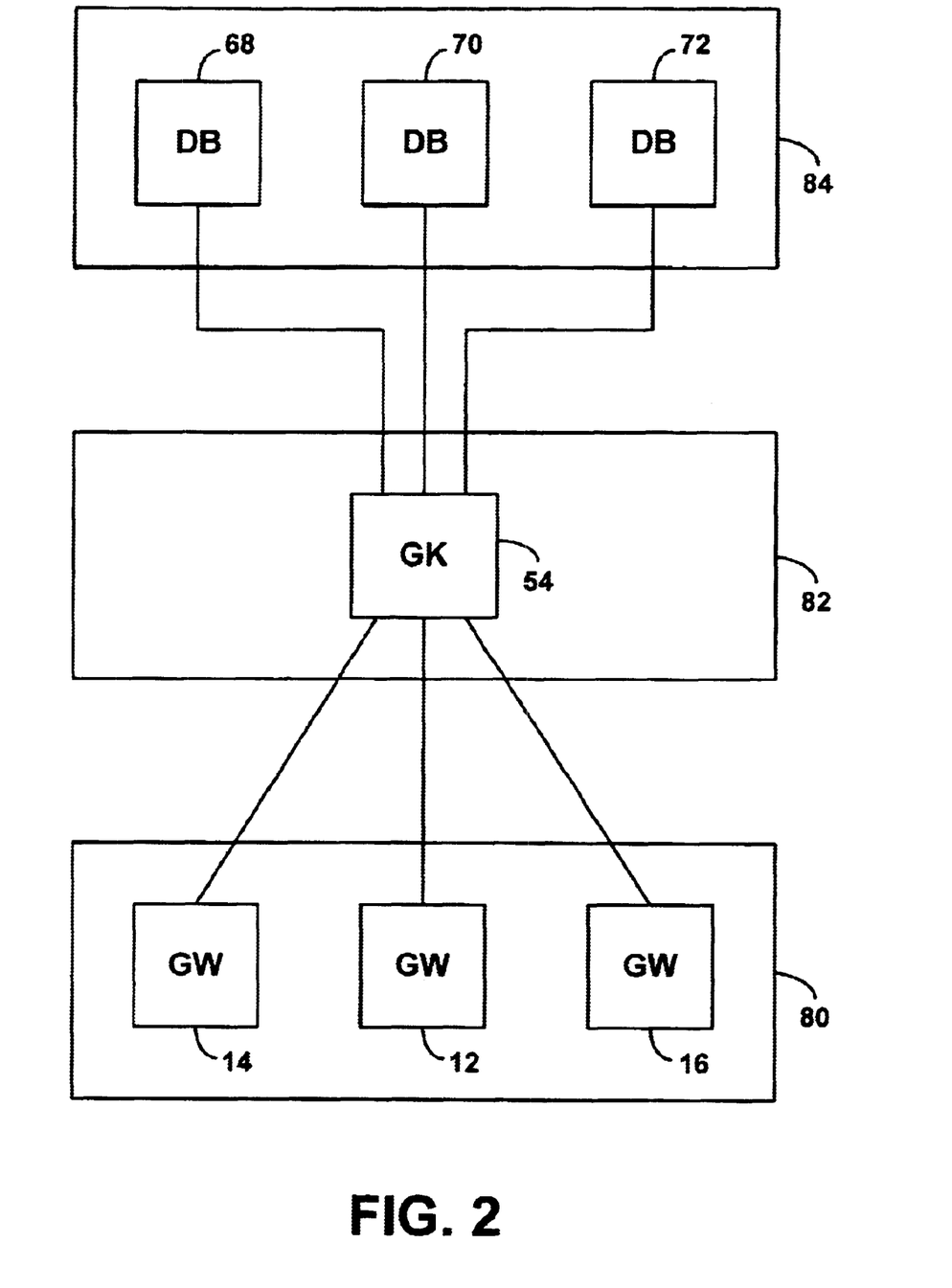
FIG. 2 is an exemplary signaling subsystem in effect in the internet telephony system of FIG. 1.

The present invention relates to signaling systems in internet telephony. A schematic overview of one such signaling system is illustrated by way of example in FIG. 2. As shown in FIG. 2, the signaling system is generally considered to comprise three tiers or subsystems: the gateway subsystem 80, the gatekeeper subsystem 82, and the database subsystem 84. The gateway subsystem receives call requests from subscribers and may responsively send signaling messages to the gatekeeper subsystem to facilitate admission and connection of the calls. The gatekeeper subsystem processes signaling messages, including receiving and responding to the signaling messages sent by the gateway subsystem, and receiving and sending other signaling messages throughout the telephony system. In processing signaling messages, the gatekeeper may send requests or queries to the database subsystem, in order to obtain and/or establish various information. The database subsystem in turn provides and/or maintains information useful for facilitating a variety of signaling functions.

The gateway subsystem typically comprises one or more gateways in a region such as gateways 12, 14 and 16 as described above. The gatekeeper subsystem typically comprises a gatekeeper 54, which controls and/or serves a group of gateways in a region, each of which may register with the gatekeeper to facilitate service. The database subsystem in turn typically comprises one or more databases or data files such as a number of back-end database servers coupled with, integrated in, or otherwise accessible by the gatekeeper. Referring to FIG. 2, for instance, gatekeeper 54 is shown coupled with three separate back-end database servers, an accounting server 68, an authentication server 70, and an address mapping server 72.

Although FIGS. 1 and 2 illustrate these three subsystems and components as separate blocks, it will be understood that, conceptually, each of the elements represents a logical unit or process, and the subsystems and components may be arranged in any way desired in the internet telephony system, whether discrete, integrated or distributed. Further, each component may take any suitable form and be located in any suitable location, and various parts of each component or subsystem may be omitted or substituted with other suitable elements.

For example, the gatekeeper may comprise one or more computers equipped with a microprocessor and a memory (and/or other data storage device) for holding a set of machine language instructions (e.g., compiled source code) that can be executed by the microprocessor. The machine language instructions may define one or more programs for carrying out various functions described herein. The computer may run any suitable operating system, such as a Microsoft Windows or Unix-based system. In addition, the computer may run client-server software for communicating with gateways and/or back-end database servers for instance. An exemplary gatekeeper can be provided by running gatekeeper protocol stack software on a suitable computer; such software and/or hardware is available from companies including Databeam, Radvision, Elemedia and VocalTek.

Additionally, for instance, various functions or portions of the gatekeeper may be embodied in one or more gateways or other elements in the telephony system, and/or the gatekeeper may be embodied in one or more distributed elements or processes in the telephony system. Still further, the functions of the gatekeeper may be implemented in one or more gateways or MCUs, or distributed throughout the region and/or telephony system in one or more physical units or separate processes.

As another example, as noted above, the database subsystem may comprise one or more databases, database servers and/or data files integrated with, coupled with or otherwise accessible by the gatekeeper. Database servers 68–72, for instance, may be stand-alone computers running database server applications (e.g., ODBC (open database connectivity) and/or LDAP (lightweight directory access protocol)) and arranged in network communication with the gatekeeper as a client or may be integrated in other elements of the telephony system in communication with the gatekeeper. Alternatively, for instance, the database subsystem may comprise databases or data files stored in a data storage medium (such as a disk drive) that is contained in, controlled or otherwise accessible by the gatekeeper.

In addition, one or more of the database servers may be communicatively coupled with other database systems. For instance, an accounting database may be coupled with one or more customer information systems providing account information for ITSP subscribers, and/or an authentication database may be coupled with one or more databases that indicate subscriber passwords, account status or other verification information. As yet another example, the database servers may be integrated into a single database server device, such as an AAA server for instance. As still another example, the information in one or more databases or data files may be shared by multiple gatekeepers in the telephony system.

Functionally, the gatekeeper is the focal point or "brain" of the internet telephony signaling system. The gatekeeper can provide important services such as addressing, authorization, authentication, bandwidth management, accounting, billing, charging, and call routing, among others. To provide these services, however, the gatekeeper and the signaling system as a whole must process a substantial number of signaling messages, and this processing defines a processing burden or workload on the gatekeeper and signaling system. Processing a signaling message may take any of a variety of forms. For example and without limitation, processing may be or may include (i) receiving a signaling message, (ii) reading a signaling message, (iii) sending a request message to the database subsystem, (iv) waiting for a response message from the database subsystem, (v) receiving a response message from the database subsystem, (vi) sending a response message to a gateway or other element, and (vii) routing a signaling message into the telephony system. Each of these and other signaling functions takes time and processing power and can therefore define a burden or signaling workload on the signaling system.

H.323 specifies a number of protocols defining some of the signaling messages that may be conveyed within the internet telephony signaling system. These signaling messages include, for instance, "registration, admission and status" (RAS) messages (defined by the H.225 protocol for example), and "call-signaling" (or "call-connection") messages and "control-signaling" (or "call-control") messages (defined by the H.245 protocol for example).

The operation of an exemplary signaling system is illustrated in part by the events that may occur when a call request arrives at a gateway, seeking call admission and connection via the packet switched network. When the gateway receives a call request, a processor in the gateway will typically send a signaling request message via the packet switched network to the gatekeeper with which the gateway has registered. A signaling request message sent to the gatekeeper is generally any signaling message that causes the gatekeeper to do some processing and therefore adds to the signaling workload. By way of example and without limitation, the signaling request message may define a request for admission of the call into the packet switched network.

One such signaling request message is an ARQ (Admission Request) message, for instance. The ARQ may define various information about the proposed call, such as the calling party telephone number and the dialed (called party) telephone number. The gatekeeper may include a programmed processor that is arranged to interpret this information as various types of signaling requests. For example, the existence of the calling party number in the ARQ may signal to the gatekeeper processor a need to authenticate the calling party and/or to start an accounting (billing) record for the call. As another example, the existence of the called party number in the ARQ may signal to the gatekeeper a need to translate the called party number into a network address.

Alternatively, an ARQ and/or other suitable signaling request message may more directly request the gatekeeper to perform certain signaling functions related to call admission. For instance, the gateway may send to the gatekeeper a discrete address translation request message (e.g., location request (LRQ) message) or a discrete authentication request message. Such authentication (authorization) and accounting requests may take the form of RAS messages, for example.

Upon receipt of an authentication request, the gatekeeper processor may be programmed to determine whether the calling party or gateway (for example) is authorized to place the requested call. Authorization may be based on any desired factor(s), including, for example, caller authorization, restricted access to/from particular gateways, and restricted access during certain periods of time. The authorization processing function may take any suitable form. For example, the gatekeeper may send a request to a back-end authentication database (or other database or data file) to confirm that the caller's account is current and valid or to otherwise authenticate the caller, or to determine whether the gateway is authorized to place the call at the given time. If the gatekeeper receives a negative response from the authentication database or otherwise fails to authenticate the caller, the gatekeeper may return an admission reject (ARJ) message to the gateway, and the gateway processor may responsively terminate the call. Alternatively, the gatekeeper or a database server may propagate a similar request to another gatekeeper and/or another database in the system in an effort to establish authorization. In any event, it is clear that the processing of each authorization request takes time and processing power, thereby burdening the signaling system.

Upon receipt of an accounting request, the gatekeeper processor may be programmed to perform an accounting function, which may also take any suitable form. By way of example, the gatekeeper may responsively send an accounting request to the back-end accounting database (such as a customer service database), to determine how to bill for the call (e.g., which local exchange carrier will bill the subscriber for the call). As another example, the gatekeeper may responsively send an accounting request to the back-end accounting database asking the accounting database server to establish a billing record for the call (e.g., to open a billing record, which would be closed at the completion of the call). In the event the database cannot provide the function requested by the gatekeeper, the gatekeeper and/or database may propagate a similar request to another gatekeeper and/or database. Again, in any event, the processing of each accounting request takes time and processing power and therefore burdens the signaling system.

Upon receipt of an address translation request, the gatekeeper may seek to translate the dialed telephone number into a network address of a terminating gateway that serves the dialed number. In typical practice, the gatekeeper may send a request to its back-end address mapping database, which may contain a translation table that is updated regularly through RAS registration messages. If the database contains the necessary address, it may return the address to the gatekeeper, and the gatekeeper may responsively return the address to the requesting gateway (e.g., in a location confirm or LCF message). If the database does not contain the necessary address, the gatekeeper may propagate an LRQ to another gatekeeper in the internet telephony system, seeking the requested address. Failing to find the necessary address, the gatekeeper may return a location reject (LRJ) and/or ARJ message to the requesting gateway, and the gateway may terminate the call. As with the processing of authorization and accounting requests, the processing of address translation requests takes time and processing power and therefore burdens the gatekeeper and the signaling system as a whole.

The gatekeeper may also process other signaling request messages related to admission. For example and without limitation, a registered gateway may send a bandwidth request (BRQ) signaling message to the gatekeeper seeking to determine whether sufficient bandwidth exists in the network to place a requested call. In this regard, a network manager or other system may specify a threshold for the number of simultaneous connections in the internet telephony system, and the gatekeeper may be programmed to refuse to allow any more connections once the threshold is reached. The gatekeeper may process this sort of signaling request message by querying a traffic management database and responding to the requesting gateway. If sufficient bandwidth exists, the gatekeeper may send a bandwidth confirm (BCF) message, and if insufficient bandwidth exists to support the requested call, the gatekeeper may send a bandwidth reject (BRJ) message. Again, the processing of these other signaling request messages additionally burdens the gatekeeper and signaling system.

If the gatekeeper successfully establishes that the requested call can be admitted (for instance, performing some or all of the foregoing functions and/or other function (s)), the gatekeeper may return an admission confirm (ACF) message to the requesting gateway. In typical practice, the gateway will then seek to establish a connection over the packet switched network with the designated terminating gateway.

To establish this connection, the gateway will typically communicate various call-connection messages with the terminating gateway to determine whether the terminating gateway and/or the called party are available and prepared to take the call. Referring to H.323, for example, among other call connection messages, the initiating gateway may send a "setup" signaling request message to the terminating gateway to request a connection, and the terminating gateway may respond with a "connect" signaling message to the initiating gateway to confirm the connection.

Figure 3:
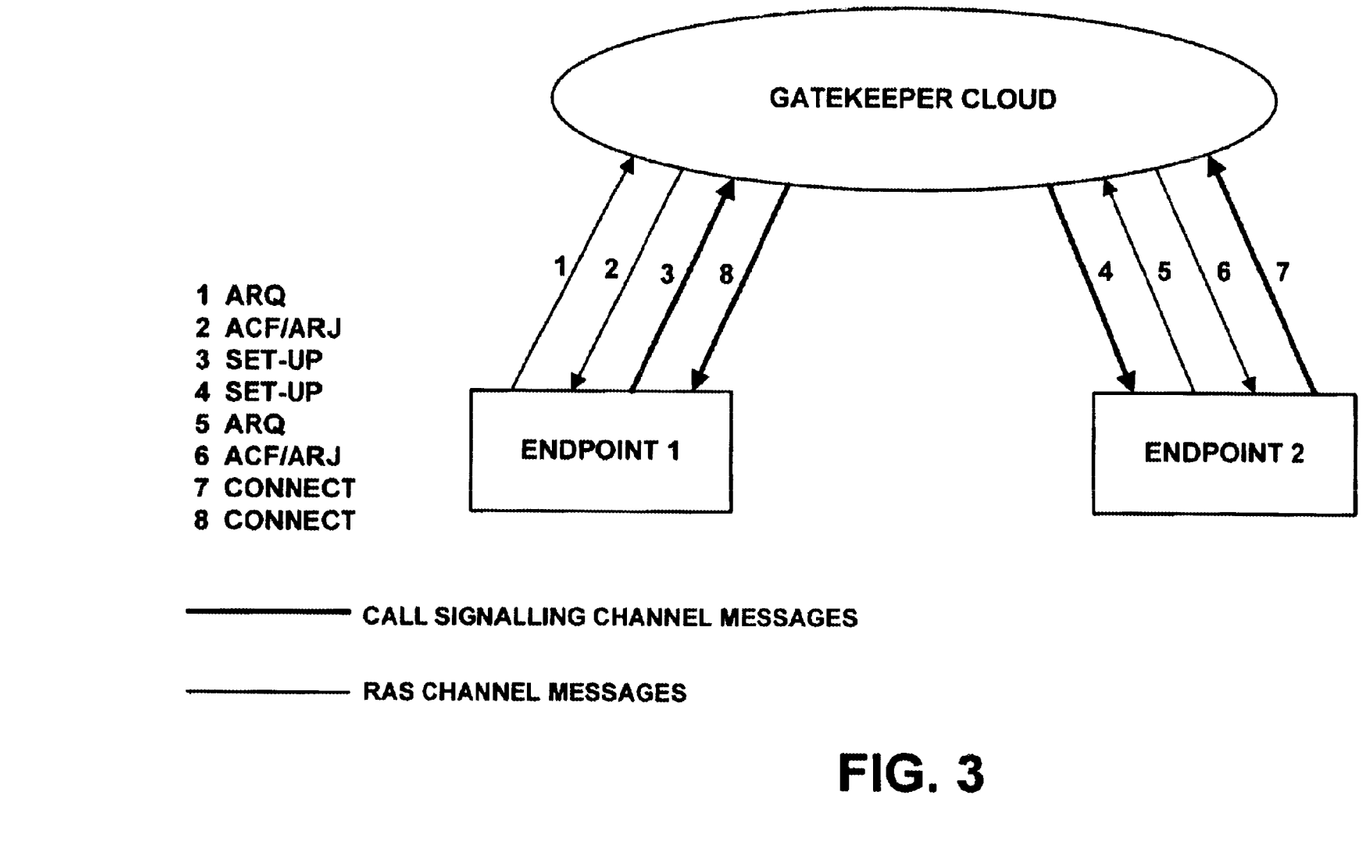
FIG. 3 illustrates gatekeeper-routed signaling according to H.323.
Figure 4:
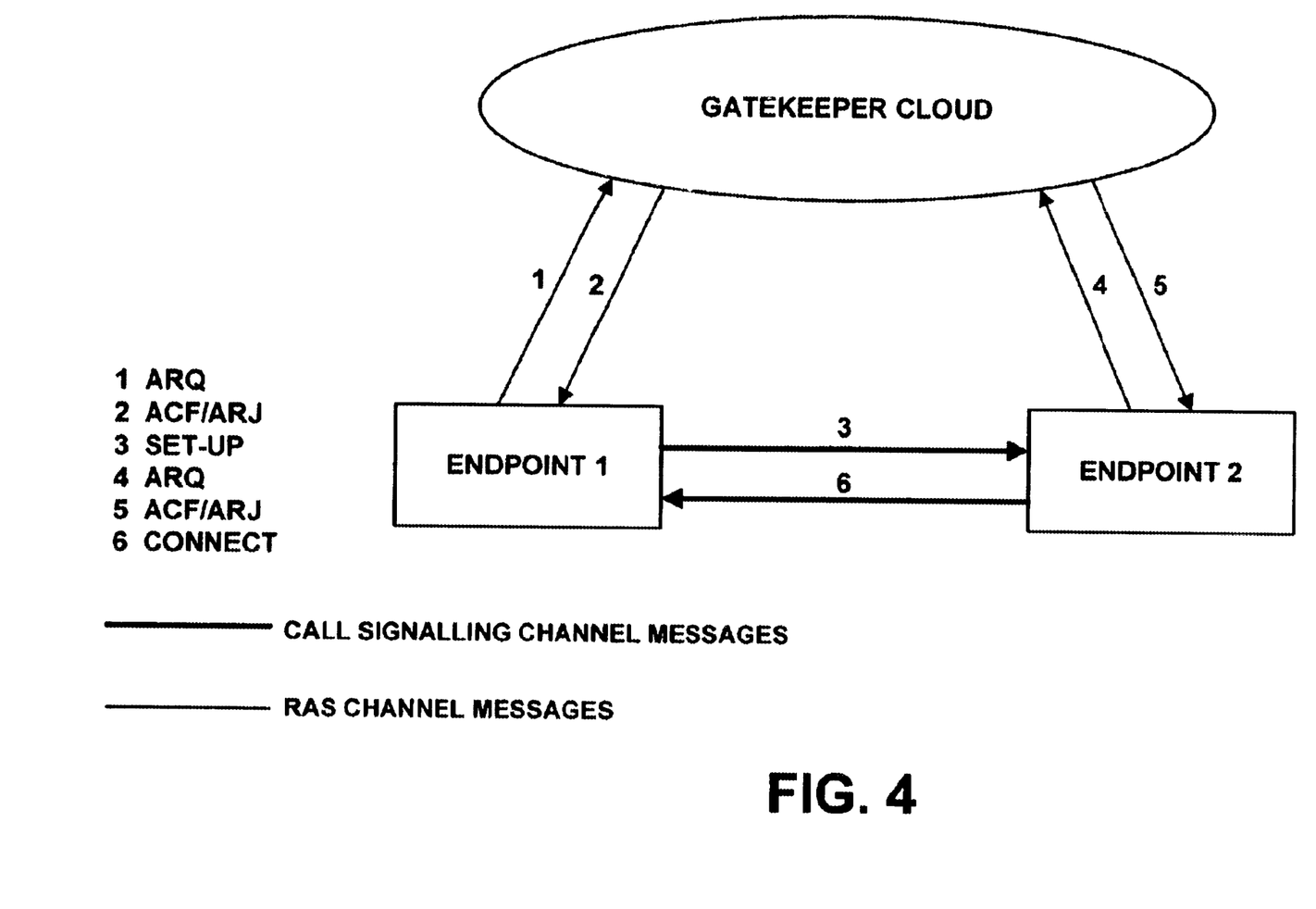
FIG. 4 illustrates direct-routed signaling according to H.323.

As noted above, the signaling system may employ either gatekeeper-routed call signaling or direct-routed call signaling. As described in H.323, these two methods are illustrated by FIGS. 3 and 4 respectively. In the gatekeeper-routed model, call-connection signaling messages are routed between endpoints via one or more gatekeepers (i.e., at least via the transmitting gateway's gatekeeper), as shown by signaling steps 3, 4, 7 and 8 in FIG. 3 for example. In the direct-routed model, call-connection signaling messages are routed directly between the peer gateways rather than via the gatekeeper(s), as shown by steps 3 and 6 in FIG. 4 for example.

According to H.323, a gatekeeper may choose between the gatekeeper-routed model and the direct-routed model and may instruct the gateway(s) in its zone accordingly. For instance, if the gatekeeper elects (or is set) to use direct-routed call-signaling, the gatekeeper may so instruct the gateway(s) in its zone, so that the gateway(s) will send such signaling messages directly to peer gateways rather than sending the messages to the gatekeeper for routing in turn to the peer gateways.

Gatekeeper routed call signaling is generally believed to provide better performance in the network, since it allows the gatekeeper to monitor calls in the network and to make routing decisions based on a variety of factors such as load balancing among gateways, for instance. However, gatekeeper routed call signaling increases the processing burden on the gatekeeper, such as by requiring the gatekeeper to receive call connection messages (in both directions), determine where to send the messages, and route them accordingly.

Similarly, during the course of an ongoing call, the internet telephony signaling system may facilitate transmission of various call-control signaling messages between endpoints (such as between initiating and terminating gateways for instance). These call-control messages may carry various information, such as information related to capabilities exchange, opening and closing of logical channels used to carry media streams and flow-control. Additionally or alternatively, the call-control messages may carry other general or specific commands and indications, such as information about new calls (e.g., ANI information for call-waiting-caller-ID, or information necessary to facilitate three-way-calling) or other information to facilitate various enhanced services for example.

As with call-connection signaling messages, the signaling system (typically the gatekeeper) may choose between gatekeeper-routing or direct routing of call-control signaling messages, and instruct the registered gateways accordingly. With gatekeeper-routed call-control signaling, some or all of the call-control messages are routed between endpoints via one or more gatekeepers. With direct-routed call-control signaling, call-control messages are routed directly between the peer gateways rather than via the gatekeeper(s). Again, however, while gatekeeper-routed call-control signaling is believed to be preferable (e.g., providing the gatekeeper with a better ability to keep track of the operations of the telephony system), gatekeeper-routing of call-control messages increases the processing burden on the gatekeeper subsystem compared with direct-routing.

As the foregoing illustrates by way of example, an internet telephony signaling system carries and processes a number of signaling messages (e.g., authorization requests, accounting requests, address translation requests, bandwidth requests, call-connection messages, and call-control messages) with respect to call requests and ongoing calls. The communication and processing of these signaling messages defines a workload or burden on the signaling system, which may be felt as the use of time, processing power, and/or signaling channel bandwidth.

For example, every database query that the gatekeeper conducts (which may be understood to include instances where the gatekeeper sends a request to a database system) or every database request that the gatekeeper sends to a back-end database server in relation to (e.g., in response to a message sent as a result of) a call request takes time and processing power. The gatekeeper must wait for the database and/or database server to process and respond to the query or request. As another example, every call-connection message or call-control message that is routed through the gatekeeper takes time and processing power as well. The gatekeeper must receive such messages, identify where to route the messages (by analysis of packet header information for instance), and route them accordingly. Still further, the generation, receipt and/or processing of other types of signaling messages may take time and processing power as well. Yet additionally, a signaling channel (such as an RAS channel for instance) may have a limited bandwidth capacity. Therefore, the more signaling messages that are carried by the signaling channel per unit time, the greater the workload or processing burden on the signaling system as well.

A signaling system should be designed to support at least a normal load of call requests arriving at the internet telephony system. In this regard, statistical modeling may be employed to determine how robust the signaling system must be. For instance, if the internet telephony system statistically expects to receive no more than n call requests per unit time, the signaling system should be designed to support at least n call requests per unit time. For example, the gatekeeper and database subsystems should be fast enough to process signaling messages related to at least n call requests per unit time and to process signaling messages related to ongoing calls as well. Additionally, the signaling channels should be of sufficient bandwidth to carry signaling messages for at least the n call requests per unit time as well as the signaling messages related to ongoing calls.

Unfortunately, however, while a signaling system may perform perfectly well under normal and expected loads, the signaling system may break down when faced with unexpectedly high loads of call requests or other instances of call congestion and associated signaling messages and processing in the network. In such instances, the signaling system may become bogged down and may consequently be unable to service some or all of the incoming call requests. In turn, calls may be blocked from entering the network.

Consider an emergency situation, such as a natural disaster (e.g., an earthquake, a storm, a flood or a fire), for example. In such a situation, everyone in the region affected by the emergency may try to use their telephones at once. As a result, there may be a surge in call requests simultaneously arriving at one or more gateways in the region. Those gateways may seek to admit all of the calls substantially at once, requesting admission, address translation and/or other signaling services from their gatekeeper(s). The gatekeeper(s) will in turn process the concomitant signaling request messages, typically querying databases and so forth. As signaling messages and processing functions converge on the gatekeeper and database subsystems, problems may arise.

Because the communication and processing of signaling messages takes time, the requests may line up in queues, waiting to be processed by the gatekeeper and/or database subsystems. For example, queues of database queries may form as gatekeepers seek to query back-end database servers to provide authorization, accounting and address translation services for all of the incoming call requests. The back-end database servers, for instance, may not be able to service all incoming database requests and may fail to operate. Further, queues of other signaling messages and processing requests may form as gatekeepers seek to process and convey signaling messages. Signaling channels may become overloaded, as the signaling system attempts to convey signaling messages related to the increased number of call requests as well as the existing calls in the telephony system. Still further, the signaling process for each call request may take so much time that call requests may time out and/or may be blocked from proceeding. Callers may, for instance, receive messages announcing that all circuits are busy, or callers may receive no response whatsoever.

In an effort to overcome this problem, a preferred embodiment of the present invention contemplates reducing the workload or processing burden of the signaling system in response to a state of congestion in the internet telephony system, and thereby allowing the signaling system to support more incoming call requests per unit time.

The state of congestion may be a state of congestion in the signaling system (e.g., more than a threshold level of signaling messages being sent to the gatekeeper subsystem and/or the database subsystem substantially at once) or a state of congestion in incoming or existing call traffic (which may result in overburdening the signaling system for instance). Further, the state of congestion may be a state of actual congestion (e.g., more than a threshold level of call requests arriving at one or more gateways in a region) or a state of potential congestion (e.g., the occurrence or existence of an event or a situation such as a natural disaster or state of emergency that may directly or indirectly cause a signaling backlog).

The reduction in signaling workload may occur in response to a device or process in the internet telephony system learning of a state of congestion in the internet telephony system. (In this regard, the internet telephony system may extend physically to any location where a state of congestion may affect the operation of the signaling system, including on the subscriber side of the gateway for instance). Learning of a state of congestion may involve detecting the state of congestion (e.g., detecting more than a threshold rate of signaling messages and/or call requests, etc.) and/or receiving a control signal indicating the existence of a state of congestion. Such a control signal may be generated by a management system or other device or process in the internet telephony system for instance.

The reduction in workload or processing burden may be accomplished at any location or locations in the signaling system and may take any suitable form. According to one aspect, for instance, the reduction in workload may comprise a reduction in the number of signaling messages that are sent to the gatekeeper subsystem and/or that are processed by the gatekeeper subsystem. By reducing the number of signaling messages that the gatekeeper subsystem needs to process, the signaling system will experience a decreased workload, freeing up resources to serve a higher rate of call requests.

According to another aspect, for instance, the reduction in workload may comprise a reduction in the number of database requests that the gatekeeper subsystem sends to the database subsystem. In this regard, a preliminary analytical analysis has shown that (in at least the direct-routed model) requests to back-end database servers (such as authentication and address translation databases) are the principal bottlenecks in the signaling system. A reduction in the number of database requests may arise directly from a reduction in the number of signaling request messages sent to the gatekeeper subsystem, particularly where those signaling request messages would normally require database requests for resolution. Alternatively, a reduction in the number of database requests may arise partially or wholly independently of a reduction in the number of signaling messages sent to the gatekeeper subsystem.

Thus, according to one aspect of a preferred embodiment, the present invention relates to a packet switched telephony system having a signaling subsystem that is arranged to perform a plurality of call setup functions with respect to each of a plurality of call requests. The telephony system may include a gateway/terminal (i.e., a gateway or an internet telephone or any other device capable of interfacing with the packet switched network for real-time media communications) and a signaling server (i.e., a gatekeeper or other intelligent processor in the signaling system) for instance.

As described above, the signaling subsystem may include various subsystems, and each of these subsystems may include various entities (e.g., devices and/or processes), which may be configured to perform one or more functions related to call setup. Call setup functions can include but are not necessarily limited to those described above, such as establishing authentication, accounting, address translation and call connection, for instance. As described above, the performance of those call setup functions creates a processing burden or workload, or signaling workload.

The preferred embodiment may then include modifying the signaling subsystem in order to reduce the signaling workload with respect to each of a plurality of call requests. Generally speaking, this function may involve modifying an entity (e.g., gateway/terminal, or gatekeeper) in the signaling subsystem so that the entity or the signaling system generally performs fewer call setup functions, thereby reducing the signaling workload and facilitating admission and connection of more calls per unit time.

Where the gateway/terminal receives call requests and responsively sends a number of signaling request messages to the signaling server, the process of modifying the signaling subsystem to reduce the signaling workload can comprise having the gateway/terminal reduce the number of signaling request messages that it transmits to the signaling server with respect to some or all of the call requests that it receives. As an example, this reduction may involve the gateway/terminal reducing the number of signaling request messages that it sends to the signaling server. As another example, the reduction may involve the signaling system (e.g., the signaling server) at least temporarily not performing certain type(s) of call setup functions.

A processor in the gateway/terminal may, for instance, be programmed to respond to a state of congestion by switching to a mode (e.g., a pre-programmed "emergency" mode) in which the gateway/terminal at least temporarily does not transmit (or transmits less often) a particular type or types of signaling request message to the signaling server upon receipt of call requests.

The particular type(s) of signaling request messages may be any type(s) desired, where the effect of reduction would be a reduction in signaling workload. For instance, and without limitation, the particular type may be authorization messages (e.g., requests for authorization), accounting messages (e.g., requests for accounting service), or address translation messages (e.g., requests for address translation). Reducing or eliminating these types of messages would necessarily reduce the signaling workload per call request and thereby allow the signaling system to serve call requests at a higher rate.

With regard to address translation, the gateway/terminal typically needs to translate telephone numbers to network addresses in order to facilitate call connection over the packet switched network. Therefore, the gateway/terminal may be programmed to reduce or eliminate the number of address translation requests that it sends to the signaling server but to instead limit incoming calls to only a predetermined set of telephone numbers. These telephone numbers may be emergency service numbers (such as police and fire) for instance or other desired numbers. The gateway/ terminal may then be pre-programmed with the network addresses for these numbers, so that the gateway/terminal can effectively conduct address translation itself, rather than further burdening the signaling system.

Phrased another way, the gateway/terminal may have a first pre-programmed mode in which the gateway/terminal sends a first set of signaling request messages to the signaling server in response to call requests, and a second pre-programmed mode in which the gateway sends a second set of signaling request messages to the signaling server in response to call requests. The second set of signaling request messages includes fewer signaling request messages than the first set. For example and without limitation, the first set may include authorization request messages and the second set may not include authorization request messages or may include such messages in only a limited number of cases (e.g., highly suspect call requests for instance). As another example, the first set may include accounting request messages and the second set may not include accounting request messages or may include such messages in only a limited number of cases.

Still alternatively, the gateway/terminal may have a first pre-programmed mode in which the gateway/terminal sends a first number of signaling request messages to the signaling server in response to each of a plurality of call requests, and a second pre-programmed mode in which the gateway/ terminal sends a second number of signaling request messages to the signaling server in response to each of the plurality of call requests. As a non-limiting example, in the first mode, in response to a call request, the gateway/ terminal may send to a gatekeeper an ARQ that includes the calling party phone number and the called party phone number, which may normally be interpreted by the gatekeeper as requests for (i) authentication, (ii) accounting and (iii) address translation. In the second mode, for instance, the gateway/terminal may exclude from such an ARQ the called party phone number, thereby effectively reducing the number of signaling request messages by one (the address translation request). As another example, in the second mode, for instance, the gateway/terminal may exclude from the ARQ the calling party phone number, thereby effectively reducing the number of signaling messages by one or two (e.g., the authentication and/or accounting requests) for instance. In either example, the gatekeeper may be programmed to interpret the lack of information in the ARQ message as fewer signaling request messages.

As another example, each of one or more gateway/ terminals in a region may be programmed to respond to a state of congestion by switching from gatekeeper routing of call-connection and/or call-control signaling messages to direct-routing of such messages. In this regard, the gateway/ terminal may have a first preprogrammed mode in which it performs gatekeeper-routing and a second preprogrammed mode in which it performs direct-routing, and the gateway/ terminal may switch from the first mode to the second mode. This switch may be a choice made by the gateway/terminal upon learning of a state of congestion or may be dictated by the signaling server (e.g., gatekeeper), such as by a control signal sent to the gateway/terminal from the signaling server or other entity in the signaling subsystem or telephony system upon learning of a state of congestion.

A processor in the signaling server may similarly be programmed to respond to a state of congestion by switching to a mode (e.g., a pre-programmed "emergency" mode) in which the signaling server at least temporarily does not perform (or performs less often) one or more type(s) of call setup function. The type(s) of call-setup functions may take any suitable form. Examples include sending database requests, and sending signaling messages (such as routing call-connection and/or call-control signaling messages for instance). For instance and without limitation, (i) in the normal mode, when the signaling server receives an ARQ message, the signaling server may be programmed to send one or more database requests to the database subsystem, but (ii) in the emergency mode, the signaling server may send fewer or no such database requests and may send a canned response such as an ACF message to the requesting gateway/ terminal.

As another example, the signaling server may be programmed to respond to a state of congestion by instructing one or more of its registered gateway/terminals to stop sending particular types of signaling request messages as described above. This function may take various forms. By way of example and without limitation, the signaling server may instruct the gateway/terminal to stop (or reduce) sending address translation requests. Because the gateway/ terminal needs to translate telephone numbers to network addresses in order to facilitate call connection over the packet switched network, however, the gateway/terminal may then be programmed to allow calls placed to only a predetermined set of telephone numbers as described above. These telephone numbers may be emergency service numbers (such as police and fire) for instance or other desired numbers. The gateway/terminal may then be pre-programmed with the network addresses for these numbers, so that the gateway/terminal can conduct address translation itself.

Phrased alternatively, the signaling server may have a first pre-programmed mode in which the signaling server performs certain types of signaling functions and a second pre-programmed mode in which the signaling server does not perform one or more of those functions (or performs the functions less often), and the signaling server may be programmed to switch from the first mode to the second mode in response to a state of congestion. In the first mode, for instance, the signaling server may be programmed to send certain type(s) of database requests, and in the second mode, for instance, the signaling server may be programmed to send fewer or none of those type(s) database requests. As another example, in the first mode the signaling server may conduct gatekeeper-routing of call-connection and call-control messages, and in the second mode the signaling server may not participate (or may participate less often) in routing such messages. To accomplish this switch, the signaling server may, for instance, instruct one or more of registered gateway/terminals to direct-route rather than to gatekeeper-route.

As another example, an exemplary embodiment may extend to a signaling server such as a gatekeeper, which performs a plurality of signaling functions associated with calls (e.g., requested calls and/or ongoing calls). The signaling server may have a first pre-programmed mode in which the signaling server is adapted to perform a first set of signaling functions with respect to calls, and a second pre-programmed mode in which the signaling server is adapted to perform a second set of signaling functions with respect to calls. The second set omits one or more functions contained in the first set, such that the signaling server does not perform certain types of functions (or performs fewer of certain types of functions) in the second mode. One of the functions in the first set may, for instance, be querying (e.g., sending a database request to) an address mapping database in order to translate telephone numbers to network addresses with respect to a plurality of call requests. In turn, in the second mode, the signaling server may be programmed to not query the address mapping database (or to do so less frequently) with respect to the plurality of call requests.

In accordance with a preferred embodiment, as mentioned above, the internet telephony system and/or signaling subsystem may be equipped with a management system that serves to identify when there is a state of congestion in the internet telephony system. The management system may then serve to alert (e.g., via a special control signal) one or more entities (devices and/or )processes in the telephony system, thereby allowing the one or more entities to take action to reduce the signaling workload and thereby permit an increased rate of call admission. The management system may be internal or external to the alerted entity.

FIG. 1 illustrates a management system 90 generally as a component coupled with the packet switched network 22 by way of example. More generally, however, the management system may take any suitable form and can be located in any suitable location and/or carried out by any suitable device or process in the telephony system. For instance, the management system may be a process carried out by a gateway, gatekeeper or router in the telephony system, or the management system may be distributed throughout the telephony system. At a most basic level, the management system may be as simple as a person monitoring call traffic and/or signaling traffic at a computer workstation and then actuating a key to generate a control signal in the presence of a state of congestion.

An exemplary system for collecting performance statistics regarding traffic and components in an internet telephony system is described, for example, in a U.S. Patent Application entitled "Method and System for Monitoring and Management of the Performance of Real Time Networks" (inventors Grabelsky et al.), filed on Feb. 19, 1999, and assigned to the owner of the present invention. The entirety of the Grabelsky application is hereby incorporated herein by reference. This performance management system may be adapted to determine when a state of congestion exists in the network. In addition, it is presently envisioned that systems including a simple network management protocol (SNMP) can be used to identify congestion in the network. Examples of such systems include TranscendWare available from 3Com Corporation and OpenView available from Hewlett Packard.

As a more specific example, without limitation, the management system may be embodied in a set of machine language instructions executed by a processor in a gateway or the gatekeeper. In the gateway, for instance, the management system may monitor the rate of call requests arriving at the gateway or the rate of signaling request messages that the gateway is sending to the gatekeeper. If the rate of call requests or signaling messages exceeds a predetermined threshold level, the gateway may thereby determine that a state of congestion exists. The gateway may in turn take action to reduce the signaling workload such as described above and may notify one or more other entities such as the gatekeeper for instance, so that the one or more other entities can also take suitable steps to reduce the signaling workload.

In the signaling server, for instance and without limitation, the management system may monitor the rate of signaling request messages arriving at the signaling server and/or the rate of signaling messages being routed by the signaling server and/or the rate of response by the database subsystem. If any of these or other indicia reveal an overburden, bottleneck or backlog, for instance, the signaling server may conclude that a state of congestion exists. The signaling server may responsively take action to reduce the signaling workload such as described above and may further notify one or more other entities such as its registered gateways for instance, so that the one or more other entities can also take suitable steps to reduce the signaling workload.

A preferred embodiment of the present invention has been described herein. It will be understood, however, that changes and modifications may be made thereto without deviating from the true spirit and scope of the invention as defined by the claims. For instance, where appropriate, individual elements described herein may be substituted with other equivalent elements now known or later developed. All examples described herein are illustrative and not necessarily limiting.

For instance, although the description has referred to an internet telephony system arranged and operating according to H.323, it should be understood that the internet telephony system is not restricted to the H.323 implementation but may more generally extend to any desired configuration, including for instance an SIP configuration. For instance, where the description (including the claims) makes reference to a "gatekeeper," the description equally refers to and covers any signaling server including, for instance, an SIP proxy.

Still further, for instance, the description provides only certain examples of signaling request messages (e.g., authorization request messages, accounting request messages, address translation request messages, bandwidth request messages, call-connection messages, and call-control messages). It will be appreciated that other types of signaling request message may now exist or be subsequently developed.

We claim:

1. In a packet switched telephony system including a signaling subsystem operable to perform a plurality of call-setup functions for each of a plurality of call requests, said call-setup functions cooperatively defining a signaling workload associated with each of said plurality of call requests, a method comprising in combination:

identifying a state of congestion in said telephony system; and responsively modifying said signaling subsystem to reduce said signaling workload associated with each of at least a plurality of said call requests, wherein said telephony system includes a gateway/terminal and a signaling server, said gateway/terminal receiving call requests and responsively transmitting a number of signaling request messages to said signaling server, wherein modifying said signaling subsystem comprises switching to a mode in which said gateway/terminal does not transmit authorization messages to said signaling server.

2. A method as claimed in claim 1, wherein identifying a state of congestion in said internet telephony system comprises detecting said state of congestion.

3. A method as claimed in claim 1, wherein identifying a state of congestion in said internet telephony system comprises receiving a control signal indicative of said state of congestion.

4. A method as claimed in claim 1, wherein identifying a state of congestion comprises determining that a state of emergency exists.

5. A method as claimed in claim 1, wherein said state of emergency comprises an occurrence of a natural disaster.

6. In a packet switched telephony system including a signaling subsystem operable to perform a plurality of call-setup functions for each of a plurality of call requests, said call-setup functions cooperatively defining a signaling workload associated with each of said plurality of call requests, a method comprising, in combination:

identifying a state of congestion in said telephony system; and     responsively modifying said signaling subsystem to reduce said signaling workload associated with each of at least a plurality of said call requests,     wherein said telephony system includes a gateway/terminal and a signaling server, said gateway/terminal receiving call requests and responsively transmitting a number of signaling request messages to said signaling server,     wherein modifying said signaling subsystem comprises switching to a mode in which said gateway/terminal does not transmit accounting messages to said signaling server.

7. In a packet switched telephony system including a signaling subsystem operable to perform a plurality of call-setup functions for each of a plurality of call requests, said call-setup functions cooperatively defining a signaling workload associated with each of said plurality of call requests, a method comprising, in combination:

identifying a state of congestion in said telephony system; and     responsively modifying said signaling subsystem to reduce said signaling workload associated with each of at least a plurality of said call requests,     wherein said telephony system includes a gateway/terminal and a signaling server, said gateway/terminal receiving call requests and responsively transmitting a number of signaling request messages to said signaling server,     wherein modifying said signaling subsystem comprises switching to a mode in which said signaling subsystem at least temporarily does not perform a predetermined type of call-setup function, said predetermined type of call setup function being selected from the group consisting of admission, authentication and accounting.

8. In a packet switched telephony system including a signaling subsystem operable to perform a plurality of call-setup functions for each of a plurality of call requests, said call-setup functions cooperatively defining a signaling workload associated with each of said plurality of call requests, a method comprising, in combination:

identifying a state of congestion in said telephony system; and     responsively modifying said signaling subsystem to reduce said signaling workload associated with each of at least a plurality of said call requests,     wherein said internet telephony system includes a gateway/terminal and a signaling server, said gateway/terminal receiving call requests and responsively transmitting a number of signaling messages to said signaling server, and said signaling server responsively performing a number of said call set-up functions; and     wherein modifying said signaling subsystem comprises reducing the number of call-setup functions performed by said signaling server in response to the signaling messages,     whereby reducing said signaling workload facilitates expedited admission of calls into said telephony system.

9. A method as claimed in claim 8, wherein said signaling server comprises a gatekeeper.

10. A method as claimed in claim 8, further comprising sending a control signal to an entity in said telephony system, said control signal indicating said state of congestion.

11. In a packet switched telephony system including a signaling subsystem operable to perform a plurality of call-setup functions for each of a plurality of call requests, said call-setup functions cooperatively defining a signaling workload associated with each of said plurality of call requests, a method comprising, in combination:

identifying a state of congestion in said telephony system; and     responsively modifying said signaling subsystem to reduce said signaling workload associated with each of at least a plurality of said call requests,     wherein said signaling subsystem includes a signaling server, said signaling server initiating a number of database queries with respect to each of a plurality of said call requests; and     wherein modifying said signaling subsystem comprises reducing the number of database queries that said signaling server initiates with respect to said plurality of call requests.

12. In a packet switched telephony system including a signaling subsystem operable to perform a plurality of call-setup functions for each of a plurality of call requests, said call-setup functions cooperatively defining a signaling workload associated with each of said plurality of call requests, a method comprising, in combination:

identifying a state of congestion in said telephony system; and     responsively modifying said signaling subsystem to reduce said signaling workload associated with each of at least a plurality of said call requests,     wherein said telephony system includes a plurality of gateway/terminals and at least one signaling server, and wherein a plurality of signaling messages associated with said call request are transmitted between a pair of said gateway/terminals to establish a connection between said pair of gateway/terminals in response to a call request;

said telephony system having a first call-connection mode in which at least a portion of said signaling messages are routed via said signaling server, and a second call-connection mode in said at least a portion of signaling messages are not routed via said signaling server; and     wherein modifying said signaling subsystem to reduce said signaling workload associated with said call request comprises switching from said first call-connection mode to said second call-connection mode,     whereby reducing said signaling workload facilitates expedited admission of calls into said telephony system.

13. In an internet telephony system of the type comprising a gateway/terminal and a gatekeeper, the gateway/terminal receiving call requests and, for each of a plurality of said call requests, the gateway/terminal sending a number of signaling request messages to the gatekeeper, and the gatekeeper responsively processing the signaling request messages to facilitate a call, said number being at least one, a method comprising, in combination:

said gateway/terminal learning of a state of congestion in said internet telephony system; and     said gateway/terminal responsively reducing the number of signaling request messages that it sends to the gatekeeper for each of a plurality of said call requests, whereby, by reducing the number of signaling request messages sent to the gatekeeper for each of a plurality of call requests, the gatekeeper experiences a reduced processing load per call request and can therefore serve call requests at a higher rate.

14. A method as claimed in claim 13, wherein learning of a state of congestion in said internet telephony system comprises said gateway/terminal detecting said state of congestion.

15. A method as claimed in claim 13, wherein learning of a state of congestion in said internet telephony system comprises said gateway/terminal receiving a control signal indicative of said state of congestion.

16. A method as claimed in claim 15, further comprising a management system sending said control signal to said gateway/terminal in response to a state of congestion in said internet telephony system.

17. A method as claimed in claim 13, wherein said signaling request messages comprise a messages selected from the group consisting of an authorization message, an accounting message, an address translation message and a call connection message.

18. In an internet telephony system comprising a gateway/terminal and a gatekeeper, the gateway/terminal receiving call requests from telephone devices and responsively sending signaling request messages to said gatekeeper, said gatekeeper processing said signaling request messages to facilitate calls associated with said call requests, said gateway/terminal having a first mode in which, in response to each of a plurality of said call requests, said gateway/terminal sends a first number of signaling request messages to said gatekeeper, a method comprising, in combination:

said gateway/terminal learning of a state of congestion in said internet telephony system; and said gateway/terminal responsively switching from said first mode to a second mode in which, in response to each of said plurality of call requests, said gateway/terminal sends a second number of signaling request messages to said gatekeeper, said second number being less than said first number, whereby, by sending fewer signaling request messages to said gatekeeper, said gatekeeper may experience a reduced workload and may therefore be able to serve call requests at an increased rate.

19. A method as claimed in claim 18, wherein learning of a state of congestion in said internet telephony system comprises said gateway/terminal detecting said state of congestion.

20. A method as claimed in claim 18, wherein learning of a state of congestion in said internet telephony system comprises said gateway/terminal receiving a control signal indicative of said state of congestion.

21. A method as claimed in claim 20, further comprising a management system sending said control signal to said gateway/terminal in response to a state of congestion in said internet telephony system.

22. A method as claimed in claim 18, wherein said internet telephony system comprises a plurality of gateway/terminals each receiving call requests and each having said first mode, and wherein said method further comprises each of a plurality of said gateway/terminals learning of a state of congestion in said internet telephony system and responsively switching to said second mode.

23. A method as claimed in claim 18, wherein said first number of signaling request messages includes an authentication message and said second number of signaling request messages does not include an authentication message.

24. A method as claimed in claim 18, wherein said first number of signaling request messages includes an accounting message and said second number of signaling request messages does not include an accounting message.

25. A method as claimed in claim 18, wherein said first number of signaling request messages includes an address translation message and said second number of signaling request messages does not include an address translation message.

26. A method as claimed in claim 25, wherein, in said second mode, said gateway/terminal admits calls to only one or more predetermined telephone numbers.

27. A method as claimed in claim 26, wherein said one or more predetermined telephone numbers consist of emergency service telephone numbers.

28. A method as claimed in claim 18, wherein, in said first mode, said gateway/terminal gatekeeper-routes call connection messages and, in said second mode, said gateway/terminal directly-routes call connection messages.

29. A method as claimed in claim 18, wherein sending said first number of signaling request messages to said gatekeeper comprises sending one or more packages of information to said gatekeeper, whereby said gatekeeper interprets said information as said first number of signaling request messages, and wherein sending fewer than said first number of signaling request messages to said gatekeeper comprises not sending at least a portion of said one or more packages of information to said gatekeeper.

30. A method as claimed in claim 29, wherein said at least a portion of said one or more packages of information comprises calling party information, whereby said gatekeeper interprets said calling party information as an authentication request and/or as an accounting request.

31. A method as claimed in claim 29, wherein said at least a portion of said one or more packages of information comprises called party information, whereby said gatekeeper interprets said called party information as an address translation request.

32. A method as claimed in claim 18, wherein sending said first number of signaling request messages to said gatekeeper comprises sending a first set of information to said gatekeeper, whereby said gatekeeper interprets said first set of information as said first number of signaling request messages, and wherein, in said second mode, said gateway/terminal sends less than said first set of information to said gatekeeper in response to each of said plurality of call requests, whereby said gatekeeper interprets said less than said first set of information as fewer than said first number of signaling request messages.

33. A method as claimed in claim 32, wherein said first set of information comprises calling party information, whereby said gatekeeper interprets said calling party information as a request to authenticate a calling party and/or to establish accounting for a call, and wherein, in said second mode, said gateway/terminal does not send said calling party information to said gatekeeper.

34. A method as claimed in claim 32, wherein said first set of information comprises a called party telephone number, whereby said gatekeeper interprets said called party telephone number as a request to translate said called party telephone number to a network address, and wherein, in said second mode, said gateway/terminal does not send said called party telephone number to said gatekeeper.

35. An internet telephony system comprising, in combination:
a plurality of telephone devices;
a packet switched network;
a signaling server coupled with said packet switched network;
a gateway coupled with said packet switched network, said gateway receiving call requests from said telephone devices and, in response to said call requests, sending signaling request messages to said signaling server via said packet switched network, said signaling server processing said signaling request messages, whereby processing said signaling request messages defines a load on said signaling server;
said gateway having a first mode in which said gateway sends a first type of signaling request message to said signaling server in response to call requests, and a second mode in which said gateway does not send said first type of signaling request message to said signaling server in response to call requests;
a management system for identifying a state of congestion in said internet telephony system and responsively providing a special control signal to said gateway;
said gateway receiving said special control signal and responsively switching from said first mode to said second mode,
wherein said first type of signaling request message is a message selected from the group consisting of an authorization message, an accounting message, an address translation message, and a call connection message
whereby, said gateway sends fewer signaling request messages to said signaling server in said second mode and thereby reduces said load on said signaling server.

36. An internet telephony system as claimed in claim 35, wherein said first type of signaling request message is an address translation message, and wherein, in said second mode, said gateway limits incoming calls to a predetermined set of telephone numbers.

37. An internet telephony system as claimed in claim 36, wherein the predetermined set of telephone numbers comprises emergency service numbers.

38. An internet telephony system as claimed in claim 37, wherein the predetermined set of telephone numbers consists of emergency service numbers.

39. An internet telephony system as claimed in claim 35, wherein
said first type of signaling request message is a call connection message;
in said first mode, said gateway routes call connection messages via said signaling server; and
in said second mode, said gateway directly routes call connection messages.

40. An internet telephony system as claimed in claim 35, wherein processing said signaling request messages comprises receiving said signaling messages.

41. An internet telephony system as claimed in claim 35, wherein processing said signaling request messages comprises conducting database queries in response to said signaling request messages.

42. An internet telephony system as claimed in claim 35, wherein processing said signaling request messages comprises routing said signaling request messages to a location in said packet switched network.

43. An internet telephony system as claimed in claim 35, wherein the management system comprises a computer system collecting information about call traffic and/or signaling traffic in said telephony system, and wherein identifying a state of congestion in said telephony system comprises said computer system identifying more than a predetermined level of call traffic and/or signaling traffic at one or more locations in said telephony system.

44. An internet telephony system as claimed in claim 35, wherein the management system comprises a human operator viewing call traffic data and/or signaling traffic data at a computer workstation.

45. An internet telephony system as claimed in claim 35, wherein the management system comprises the signaling server, and providing said special control signal to said gateway comprises said signaling server sending the special control signal to the gateway via the packet switched network.

46. An internet telephony system as claimed in claim 35, wherein the management system provides the special control signal to the gateway via the packet switched network.

47. An internet telephony system as claimed in claim 35, wherein the management system comprises a human being.

48. In an internet telephony system of the type comprising a gateway subsystem, a gatekeeper subsystem, and a database subsystem, said gateway subsystem receiving call requests and responsively sending a number of signaling request messages to said gatekeeper subsystem, said gatekeeper subsystem receiving said signaling request messages and responsively sending a number of database request messages to said database subsystem with respect to a plurality of call requests, a method comprising, in combination:
said gatekeeper subsystem learning of a state of congestion in said internet telephony system; and
in response to learning of said state of congestion, said gatekeeper subsystem reducing the number of database request messages that it sends to said database subsystem with respect to said plurality of call requests,
whereby, by reducing the number of database request messages that it sends with respect to said plurality of call requests, said gatekeeper subsystem may expedite admission into said internet telephony system of calls associated with said call requests.

49. A method as claimed in claim 48, wherein learning of a state of congestion in said internet telephony system comprises detecting said state of congestion.

50. A method as claimed in claim 48, wherein learning of a state of congestion in said internet telephony system comprises receiving a control signal indicative of said state of congestion.

51. A method as claimed in claim 50, further comprising a management subsystem detecting a state of congestion in said internet telephony system and responsively providing said control signal to said gatekeeper subsystem.

52. A method as claimed in claim 48, wherein identifying a state of congestion comprises determining that a state of emergency exists.

53. A method as claimed in claim 48, wherein said number of database request messages comprise a first type of database request message selected from the group consisting of an authorization request, an accounting request, and an address translation request.

54. A method as claimed in claim 53, wherein reducing the number of database request messages that it sends to said database subsystem with respect to said plurality of call requests comprises not sending authorization requests with respect to said plurality of call requests.

55. A method as claimed in claim 53, wherein reducing the number of database request messages that it sends to said database subsystem with respect to said plurality of call requests comprises not sending accounting requests with respect to said plurality of call requests.

56. A method as claimed in claim 53, wherein reducing the number of database request messages that it sends to said database subsystem with respect to said plurality of call requests comprises not sending address translation requests with respect to said plurality of call requests.

57. A method as claimed in claim 48, wherein said number of database request messages comprise a first type of database request message selected from the group consisting of an authorization request, an accounting request, and an address translation request.

58. A method as claimed in claim 48, wherein reducing the number of database request messages that it sends to said database subsystem with respect to said plurality of call requests comprises causing said gateway subsystem to reduce said number of signaling request messages that said gateway subsystem sends to said gatekeeper subsystem.

59. A method as claimed in claim 58, wherein causing said gateway subsystem to reduce said number of signaling request messages that said gateway subsystem sends to said gatekeeper subsystem comprises instructing said gateway subsystem to switch from gatekeeper-routed signaling to direct-routed signaling.

60. A signaling server for use in a packet switched telephony system,
said signaling server performing a plurality of signaling functions associated with calls, whereby performing said signaling functions defines a processing burden on said signaling server;
said signaling server having a first mode in which said signaling server is adapted to perform a first set of signaling functions associated with calls, and a second mode in which said signaling server is adapted to perform a second set of signaling functions associated with calls, said second set omitting one or more functions contained in said first set;
said signaling server learning of a state of congestion in said telephony system and responsively switching from said first mode to said second mode,
whereby switching to said second mode reduces said processing burden and thereby enables said signaling server to expedite processing of signaling messages associated incoming calls to said telephony system.

61. A method as claimed in claim 60, wherein learning of a state of congestion in said telephony system comprises said signaling server detecting said state of congestion.

62. A method as claimed in claim 60, wherein learning of a state of congestion in said telephony system comprises said signaling server receiving a control signal indicative of said state of congestion.

63. A method as claimed in claim 62, further comprising a management system detecting a state of congestion in said internet telephony system and responsively sending said control signal to said signaling server.

64. A method as claimed in claim 60, wherein said one or more functions contained in said first set comprises authenticating calling parties with respect to a plurality of call requests,
whereby, in said second mode, said signaling server does not authenticate calling parties with respect to said plurality of call requests.

65. A method as claimed in claim 64, wherein authenticating calling parties comprises querying an authentication database.

66. A method as claimed in claim 62, wherein said one or more functions contained in said first set comprises establishing call accounting with respect to a plurality of call requests,
whereby, in said second mode, said signaling server does not establish call accounting with respect to said plurality of call requests.

67. A method as claimed in claim 66, establishing call accounting comprises querying an accounting database.

68. A method as claimed in claim 60, wherein said one or more functions contained in said first set comprises querying an address mapping database in order to translate telephone numbers to network addresses with respect to a plurality of call requests,
whereby, in said second mode, said signaling server does not query said address mapping database in order to translate telephone numbers to network addresses with respect to said plurality of call requests.

69. A method as claimed in claim 60,
wherein said gateway/terminal receives call requests and responsively sends a number of signaling request messages to said signaling server to facilitate placement of calls associated with said call requests;
wherein said first set of signaling functions comprises processing said signaling request messages, and said one or more functions comprises processing a subset of said signaling request messages,
whereby, in said second mode, said signaling server processes fewer than said number of signaling request messages.

70. A signaling server in an internet telephony system, said signaling server having a first mode in which said signaling server routes call-connection messages being transmitted between an initiating gateway and a terminating gateway, and a second mode in which said signaling server does not participate in routing of call-connection messages between said initiating gateway and said terminating gateway, said signaling server learning of a state of congestion in said internet telephony system, and said signaling server comprising:
a processor;
data storage; and
machine instructions stored in the data storage and executable by the processor, in response to the signaling server learning of the state of congestion, to switch from said first mode to said second mode.

71. The signaling server of claim 70, wherein learning of a state of congestion in said telephony system comprises said signaling server detecting said state of congestion.

72. The signaling server of claim 70, wherein learning of a state of congestion in said telephony system comprises said signal server receiving a control signal indicative of said state of congestion.

73. The signaling server of claim 72, further comprising a management system detecting a state of congestion in said internet telephony system and responsively sending said control signal to said signal server.

74. The signaling server of claim 70, wherein, in response to learning of said state of congestion, said signaling server further instructs said initiating gateway to directly route call-connection messages to said terminating gateway.

75. An internet telephony system comprising, in combination:
- a plurality of telephone devices;
- a packet switched network;
- a signaling subsystem comprising a signaling server and a database system, said signaling server being coupled with said packet switched network and with said database system, said signaling server including a signaling processor for receiving signaling messages and responsively querying said database system, whereby querying said database system defines a load on said signaling subsystem;
- a gateway coupled with said packet switched network, said gateway including a telephone interface, a gateway processor and a network interface, said telephone interface receiving call requests from said telephone devices, said gateway processor generating a predetermined request message in response to each of at least a plurality of said call requests, and said network interface sending said predetermined request message to said signaling server via said packet switched network;
- said signaling server having a first mode in which said signaling processor queries said database system in response to said predetermined request message and, based on information provided by said database system, said signaling server returns a response message to said gateway;
- said signaling server having a second mode in which said signaling server returns a response message to said gateway without querying said database system;
- a management system for identifying a state of congestion in said internet telephony system and responsively providing a special control signal to said signaling server;
- said signaling server receiving said special control signal and responsively switching from said first mode to said second mode,
- whereby, said signaling server reduces its queries to said database system by switching to said second mode and thereby reduces said load on said signaling server.

76. A method for reducing load on a signaling server in an internet telephony system, said internet telephony system comprising a plurality of telephone devices, a packet switched network, and a gateway coupled with said packet switched network, said gateway receiving call requests from said telephone devices and, in response to said call requests, sending predetermined request messages to said signaling server via said packet switched network, said signaling server having a first mode in which said signaling server conducts database queries in response to said predetermined request messages, said method comprising:
- identifying a state of congestion in said internet telephony system and responsively switching said signaling server to a second mode in which said signaling server does not conduct database queries in response to said predetermined request messages.

\* \* \* \* \*